United States Patent [19]
Nicholls

[11] 3,726,539
[45] Apr. 10, 1973

[54] VEHICLE SUSPENSION UNITS

[75] Inventor: Lawrence G. Nicholls, Birmingham 11, Tyseley, England

[73] Assignee: Girling Limited, Birmingham, England

[22] Filed: July 24, 1970

[21] Appl. No.: 57,966

[30]    Foreign Application Priority Data

July 25, 1969   Great Britain.....................37,544/69

[52] U.S. Cl..........280/96.2 R, 280/124 F, 285/382.4
[51] Int. Cl. ................................................B62d 7/14
[58] Field of Search......................280/96.1, 96.2, 96, 280/95, 93; 285/382.4, 382.5, 222

[56]           References Cited

UNITED STATES PATENTS 3,139,159   6/1964   Lob.......................................188/322
3,493,242   2/1970   Nicholls..............................280/96.2
1,742,793   1/1930   Staples ..............................285/222 X
2,413,840   1/1947   Mercier..........................285/382.4 X
  425,948   4/1890   Herbert..........................285/382.9 X

FOREIGN PATENTS OR APPLICATIONS 792,971   1/1936   France ................................285/222
1,031,650   6/1966   Great Britain......................280/96.2

Primary Examiner—Leo Friaglia
Assistant Examiner—John P. Silverstrim
Attorney—Scrivener, Parker, Scrivener and Clarke

[57]           ABSTRACT

A suspension unit comprising a stub axle and a telescopic damper unit in which the body tube of the damper is mechanically locked in the stub axle. The tube passes through a bore in the stub axle up to a shoulder on the tube, and the extreme end of which is spun out to form a flange, so that the stub axle is gripped between the shoulder and the flange.

2 Claims, 1 Drawing Figure

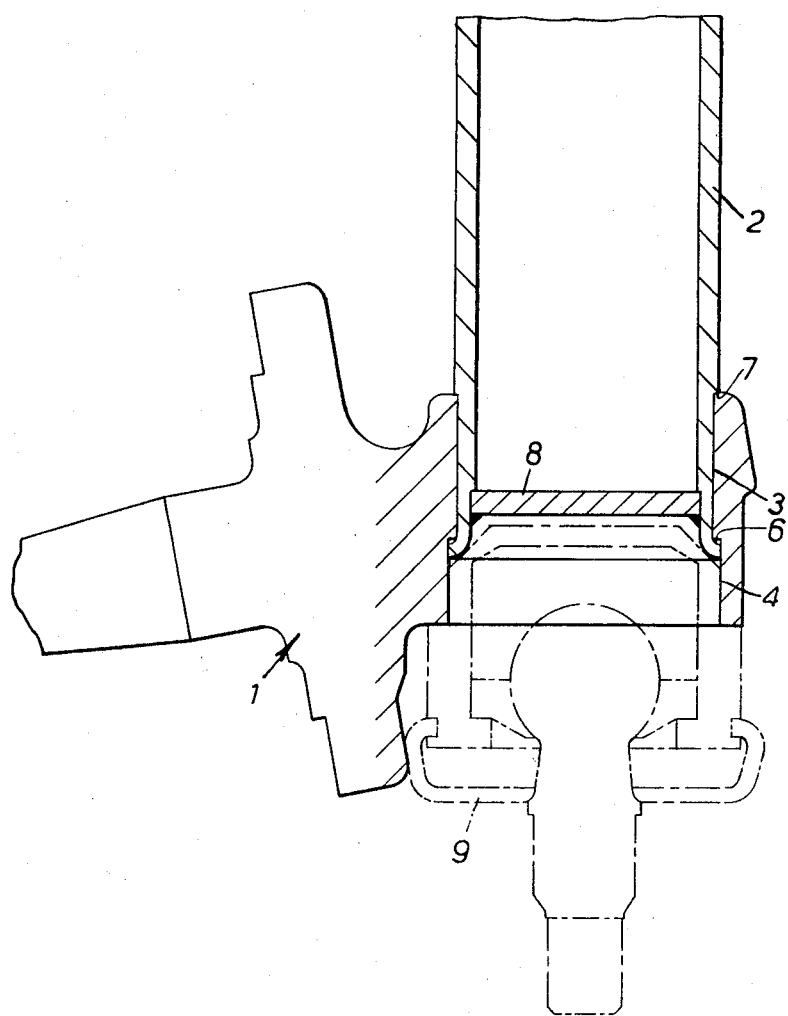

VEHICLE SUSPENSION UNITS

This invention relates to vehicle suspension units of the type in which the tubular body (tube) of a telescopic damper forming part of the suspension strut is secured at its lower end to a stub axle assembly.

This is usually effected by brazing or welding the tube to the stub axle, but this operation calls for careful control of the heat applied if metallurgical deterioration of the stub axle and/or distortion of the tube are to be avoided. Indeed, it is usual to design the unit so that the damper piston will not, at any time, travel into the lower end of the tube in which such distortion is likely to occur.

The present invention aims at overcoming this difficulty and in accordance with the invention, the tube is mechanically locked in the stub axle, without the use of brazing or welding.

In a presently preferred form of the invention, the tube is formed with a lower end portion of reduced external diameter bounded from above by a downwardly facing shoulder, and is passed through a bore in the stub axle, and the lower end edge of the tube is flared outwardly to form a flange, the said shoulder and flange locking the tube against axial displacement relative to the stub axle.

A preferred form of suspension unit in accordance with the invention is described below, by way of example only with reference to the accompanying drawing, which shows the lower portion of the unit in axial cross-section.

The unit comprises a stub axle 1 in the form of a steel forging, and a telescopic damper having a tubular body 2.

The stub axle is formed with a through bore 3 having a counterbore 4 to a shoulder 6 and the lower end portion of the tube 2 is machined to have its outside diameter reduced as far as a downwardly facing shoulder 7. This reduced diameter is a force fit in the bore 3. Internally, the tube is counterbored to receive an end cap 8 which is welded or brazed in position to close the lower end of the tube.

On assembly, the lower, reduced portion of the tube is forced through the bore 3 up to the shoulder 7 and the projecting lower end edge of the tube is then flared outwardly, as by spinning, to lock against the shoulder 6, thereby mechanically locking the tube against axial displacement relative to the stub axle.

A ball joint 9 is shown in dotted line, may be fitted to the stub axle from below and this can be arranged to provide added security against the tube 2 being displaced downwardly through the stub axle.

The tube 2 may be the tube of a monotube damper or the outer tube of a twin tube damper.

I claim:

1. A vehicle suspension unit comprising a stub axle member having a bore therein including upper and lower annular edge parts, a telescopic damper including a body tube having a lower end portion of reduced external diameter received in said bore, a downwardly facing shoulder at the upper end of said lower end portion engaging the upper annular edge part of said bore, an outwardly directed flange at the lower end of said tube engaging the lower annular edge part of said bore, said shoulder, flange and edge parts providing the sole means for locking said tube against axial displacement relative to said stub axle, a counter bore in the lower end of said tube defining a downwardly facing annular shoulder spaced above said flange, and an end cap within said tube engaging the shoulder and permanently secured to the wall of the tube to close the lower end thereof.

2. A unit as claimed in claim 1 comprising a ball joint assembly fitted into the said counterbore in the stub axle and providing added security against downward displacement of the tube relative to the stub axle member.

* * * * *